United States Patent [19]

Clark et al.

[11] Patent Number: 4,761,684
[45] Date of Patent: Aug. 2, 1988

[54] TELEPHONE ACCESS DISPLAY SYSTEM

[75] Inventors: Morris Clark, Miami Springs, Fla.; Kenneth Lawson, Salt Lake City; James Izatt, West Jordan, both of Utah

[73] Assignee: Video Jukebox Network, Miami, Fla.

[21] Appl. No.: 930,207

[22] Filed: Nov. 14, 1986

[51] Int. Cl.[4] .................. H04N 7/10; H04H 9/00; H04M 11/00
[52] U.S. Cl. .................. 358/86; 358/84; 455/4; 379/105
[58] Field of Search .......... 358/84, 86; 455/2, 4; 379/102, 105

[56] References Cited

U.S. PATENT DOCUMENTS

| | | | |
|---|---|---|---|
| 3,278,677 | 10/1966 | Fannoy . | |
| 3,790,700 | 2/1974 | Callais et al. . | |
| 3,997,718 | 12/1976 | Ricketts et al. . | |
| 4,028,733 | 6/1977 | Ulicki | 358/86 X |
| 4,071,697 | 1/1978 | Bushnell et al. . | |
| 4,264,923 | 4/1981 | Reich | 358/86 |
| 4,264,924 | 4/1981 | Freeman | 358/86 |
| 4,331,974 | 5/1982 | Cogswell et al. | 358/86 |
| 4,367,548 | 1/1983 | Cotten, Jr. et al. | 358/86 X |
| 4,381,522 | 4/1983 | Lambert | 358/86 |
| 4,404,589 | 9/1983 | Wright, Jr. | 358/86 |
| 4,450,477 | 5/1984 | Lovett | 358/86 |
| 4,451,701 | 5/1984 | Bendig . | |
| 4,499,568 | 2/1985 | Gremillet . | |
| 4,506,387 | 3/1985 | Walter | 358/86 X |
| 4,521,806 | 6/1985 | Abraham | 358/86 |
| 4,567,512 | 1/1986 | Abraham | 358/86 |
| 4,584,603 | 4/1986 | Harrison | 358/86 |
| 4,590,516 | 5/1986 | Abraham | 358/86 |
| 4,650,929 | 3/1987 | Boerger et al. | 358/86 |

FOREIGN PATENT DOCUMENTS 2174874  11/1986  United Kingdom .................. 358/86

OTHER PUBLICATIONS

A. F. Bulfer, "Dial-A-View", talk given at the Motion Picture Industry Seminar, Dec. 3, 1984, Los Angeles, Calif.

Texscan, "High Performance Character Generator", Spectragen III, brochure, Texscan MSI/Compuvid, Salt Lake City, Utah.

Texscan, "Video Teletext Option Interactive Public Access", model IPA-1, brochure, Texscan MSI/Compuvid, Salt Lake City, Utah.

Texscan MSI/Compuvid, "Public Access (PA-1)-Installation-Operation", SG3A/S64 Technical Manual, pp. A-18-A-28, Texscan MSI/Compuvid, Salt Lake City, Utah.

Texscan, "High Resolution Character Generator", Spectragen 4, brochure, Texscan MSI/Compuvid, Salt Lake City, Utah.

*Primary Examiner*—Keith E. George
*Attorney, Agent, or Firm*—Dickstein, Shapiro & Morin

[57] ABSTRACT

A method using a programmed data processor to operate a cable television system wherein a subscriber can select video information to be displayed on a common channel of the television monitors of all subscribers. The subscriber accesses the data processor by use of a touch tone telephone and selects video information to be broadcast by inputting a digital code using his touch tone telephone. The data processor processes the signal generated, retrieves the video information from memory and places it on queue to be broadcast.

20 Claims, 11 Drawing Sheets

FIG. 6

- 230 BRK
- 232 IN DEFAULT SCRIPT? — NO → 234 RET
- YES ↓ E
- 236 LOOP N TIMES? — YES → 238 RET
- NO ↓
- 240 DISPLAY SCRIPT NUMBER AND FIND FILE
- 242 VALID SCRIPT FILE? — NO → 248 DISPLAY ERROR
- YES ↓
- 244 EXECUTE SCRIPT FILE (GO TO 'SCRIPT')
- 246 LOG SCRIPT IN LOG FILE
- 250 CLEAR DISPLAY PROMPTS-REMOVE FROM QUEUE

FIG. 7

- 300 I SERV
- 302 IS MODEM PRESENT? — NO ↓
- YES → 304 SERVICE MODEM (GO TO 'TT SERV')
- 306 SERVICE KEYBOARD (GO TO KY SERV)
- 308 RET

TELEPHONE ACCESS DISPLAY SYSTEM

BACKGROUND OF THE INVENTION

The present invention relates generally to a method of displaying subscriber selected video information on a television monitor. More particularly, the present invention relates to a method including a programmed data processor of operating a cable television system wherein the video information broadcast is selected by a cable television subscriber using a telephone keypad. The data processor controls the retrieval of the information from its storage location and broadcasts the video selection to all subscribers.

There presently are systems that allow a subscriber to view selected video information on cable television. In a first such system a transmitting station utilizes a coder unit to scramble the video and audio signal so that a conventional television cannot receive the signals clearly. A decoder is provided for each subscriber to unscramble the coded signal. The use of the decoder is recorded for billing purposes. This system allows the subscriber to view video information chosen by the cable company. However, the subscriber cannot view video information chosen by the subscriber.

In a second system the subscriber is furnished with a list of video information that may be chosen. This video information is supplied through a free channel. The subscriber actuates a control at his home which searches for the free channel through a cable. When that channel is found the subscriber actuates a selector control which transmits through the free channel to the cable station a signal corresponding to the video information selected. The station then automatically selects the required film and starts the broadcast of the video information. This type of system is disclosed in U.S. Pat. No. 3,278,677 to Fannoy.

In a third system such as in U.S. Pat. No. 4,264,924 to Freeman a private coaxial distribution network allows a transmitting station to simultaneously transmit a plurality of unscrambled subscription television program signals to a plurality of subscribers on a plurality of television channels. The signals are related in time and content to each other and each is transmitted at a different frequency which corresponds to a different television reception channel, with regular or free television programming being simultaneously provided at one or more further different television reception channel frequency. Each subscriber is provided a switch by which he can choose to view free television, listen to music or view pay television.

In a fourth system a control unit is provided at the subscriber's home. The subscriber is provided with a list of video information that may be chosen. The subscriber actuates the control or command terminal unit to select the video information. This command terminal unit is a micro-processor with a key pad coupled to the telephone system and a cable. The cable system sends this video information in time compressed form to only the subscriber that requested it. The video information is converted to real time before it is broadcast at the subscriber's home. This type of system is disclosed in U.S. Pat. No. 4,590,516 to Abraham and U.S. Pat. No. 4,567,512 to Abraham.

In a fifth system a telephone at the subscriber's home is utilized instead of the control unit to select video information for viewing. The subscriber dials the cable television company and enters a digital code corresponding to the selected video information. The video information is sent via cable in time compressed form and broadcast to the subscriber requesting it. This type of system is disclosed in U.S. Pat. No. 4,521,806 to Abraham.

In U.S. Pat. No. 4,381,522 to Lambert a sixth system is disclosed. A subscriber enters a digital code on a telephone corresponding to the selected video information. In this system there are a plurality of channels. There is a minicomputer at the cable station that responds to viewer selection signals provided on the telephone line. The channel, and the start and stop times for the selected program, are displayed on the television monitor of all subscribers. The program is then broadcast so that any subscriber interested can view it. Each selected program is typically assigned for broadcast in the order that it is received.

These systems however do not allow a subscriber to select and view video information that will be broadcast to all subscribers on one common channel using only a conventional television and a touch tone keypad. The systems described above involve complex electronic equipment that increases the overall cost and down time of the system.

SUMMARY AND OBJECTS OF THE INVENTION

In view of the foregoing, it should be apparent that there still exists a need in the art for a method of operating a cable system so that a subscriber can select video information to be broadcast to all subscribers on one common channel using only a conventional touch tone keypad.

It is therefore an object of this invention to provide a method for subscribers of a cable television system to select video information to be broadcast on one common channel to all subscribers' television monitors using a touch tone telephone.

It is another object of this invention to provide a method for placing video information on queue to be broadcast in accordance with the time the selection was made by the subscriber.

These and other objects are achieved by a method of operating a cable television system using a programmed data processor in which a subscriber can select certain video information that is then displayed on one common channel of the television monitors of all subscribers. The subscriber's telephone keypad is used to access a data processor. The invention may be designed to be used with the telephone company's "900" service. Using this service a caller is charged a nominal fee per call by the telephone company. The cable television system then recovers a portion of the fee from the phone company. The subscriber then enters a digital code on the telephone keypad that corresponds to the video information desired for viewing. Thus video information is retrieved by the data processor from a memory device and broadcast over the cable system to the television monitors of all subscribers.

The inventive method also includes the step of placing the video information in line or on queue so that the first video information selected is the first video information broadcast on the common channel and subsequent video information selected is broadcast in turn according to the relative time it was selected.

BRIEF DESCRIPTION OF THE DRAWINGS

FIG. 6 is a flow chart showing the functional steps of the "BRK" subroutine of the present inventive method;

FIG. 7 is a flow chart showing the functional steps of the "ISERV" subroutine of the present inventive method;

DETAILED DESCRIPTION OF THE PREFERRED EMBODIMENT

Figure 1:
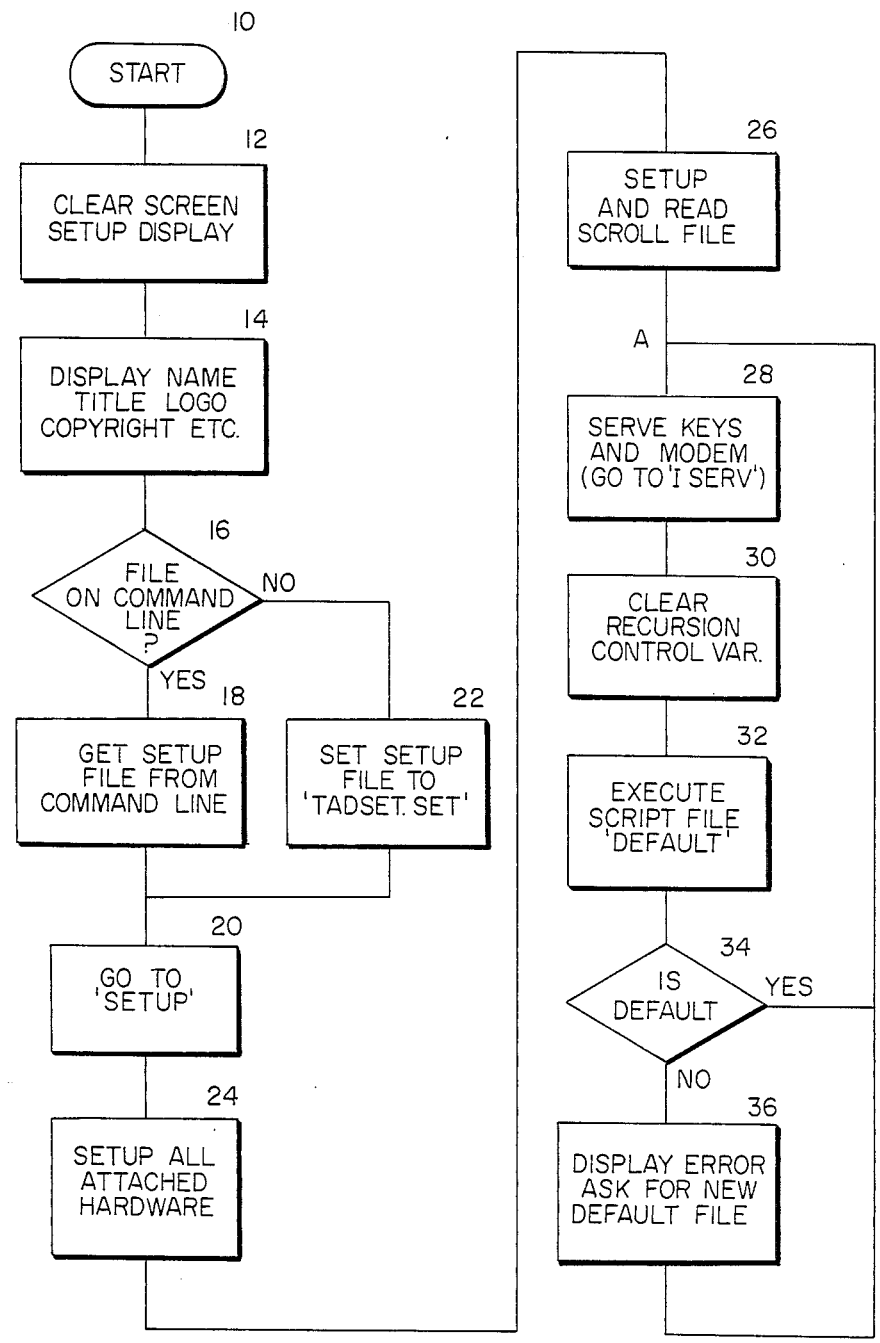
FIG. 1 is a flow chart showing the functional steps utilized by the method of the present invention.

Referring now to the drawings wherein like parts are designated by like reference numerals throughout, there is illustrated in FIG. 1 a flow chart showing the overall operation of the method of the present invention. That method is designed to be utilized by a cable television subscriber or a viewer of non-cable television, using the subscriber's or viewer's television, a telephone keypad, a modem and a programmed data processor. The television can be connected to receive the television signal using any available means, such as by cable, satellite or other broadcast transmission medium. The method of the present invention allows subscribers to request video information for display on one common channel of their televisions using a telephone operated control link. The inventive method may also be used on a plurality of independent channels.

The subscriber uses a telephone keypad to access the CATV system's central computer, by communicating through a modem. The subscriber can then select particular video information for display on his own television and also on all televisions tuned to the particular cable channel utilized by the CATV system by providing a predetermined code to the CATV system's computer via his telephone. Such video information may include graphics, text, music videos, or any other audio or video information. Graphics and text may be displayed simultaneously with other video information. Such audio/video information may be stored on any suitable storage means, such as a laser disk, a VCR, other tape storage means, or any other suitable electronic storage means. The method of the present invention also allows an operator of the CATV data processor to select video information to be broadcast by entering a digital code on the keyboard of the control console. The types of information broadcast may be commercial spots, the results of contests polling information, etc.

At the beginning of utilizing the inventive method, the program is read into the data processor and started 10. The subscriber's television display screen is then cleared and the display setup 12. The title logo and copyright notice is then displayed 14. The program next determines whether the setup file is on the command line 16. If the setup file is on the command line, the setup file is retrieved from the command line 18. The "Setup" subroutine is then executed 20. If the setup file is not on the command line, then the setup file is set to "TADSET.SET" 22. That functions to put the setup file on the command line. The "Setup" subroutine is then likewise executed 20.

The program then sets up the attached hardware 24. Such hardware may include the modem, a printer, a keyboard or other peripherals. When the hardware is set up, the scroll file is also setup and then read 26. The scroll file contains a menu listing video information available for viewing by the subscriber. The program then checks the keys and the modem using the "ISERV" subroutine 28. "ISERV", as will be explained below, allows the program to access a subscriber's telephone by modem or to receive commands from the CATV console keys.

The program then clears the recursion control variable 30. That step merely makes sure that the variables are set to their lowest level. The "Script" subroutine 32 is then executed. At this point, the "Script" subroutine runs only the "Default" command. Those "Default" commands are executed before the viewer makes a selection. The program then determines whether the "Default" command is valid 34. Such "Default" commands result in the television screen displaying instructional messages, for example, the cost of each selection, the selections available and instructions for using the subscriber's telephone keypad in order to make a selection. This inventive method may also display this information while other video information is displayed. If the "Default" command is valid, then the program returns to A and once again checks the input from the subscriber's telephone 28. If the "Default" command is not valid, the program then displays the error and requests a new "Default" file 36. The program then returns to A and once again checks the input from the subscriber's telephone 28.

Figure 2:
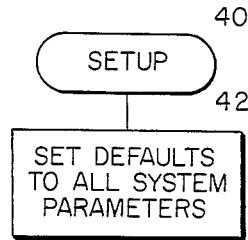
FIG. 2 is a flow chart showing the functional steps of the "Setup" subroutine of the present inventive method.

Referring now to FIG. 2, which illustrates the setup subroutine, when it is determined that the setup file is on the command line, the file is passed to the "Setup" subroutine 40. Once the setup file has been passed to the "Setup" subroutine 40, the program first sets defaults to all system parameters 42. Next, the program determines if the setup file is valid 44. If the setup file is not valid, an error is displayed and the computer asks for a new setup file 46. A determination is then made whether it is a new file or a skip 48. If it is a skip, the program then returns to the calling program 50. If it is a new setup file, the program returns to B and once again determines whether the setup file is valid 44. If the setup file is valid, the program next reads the next line of the setup file 52 and determines whether it is the end of the file 54. If it is the end of the file, the program returns to the calling program 56. If it is not the end of the file, the program returns to C and once again reads the next line of the setup file 52.

Figure 3:
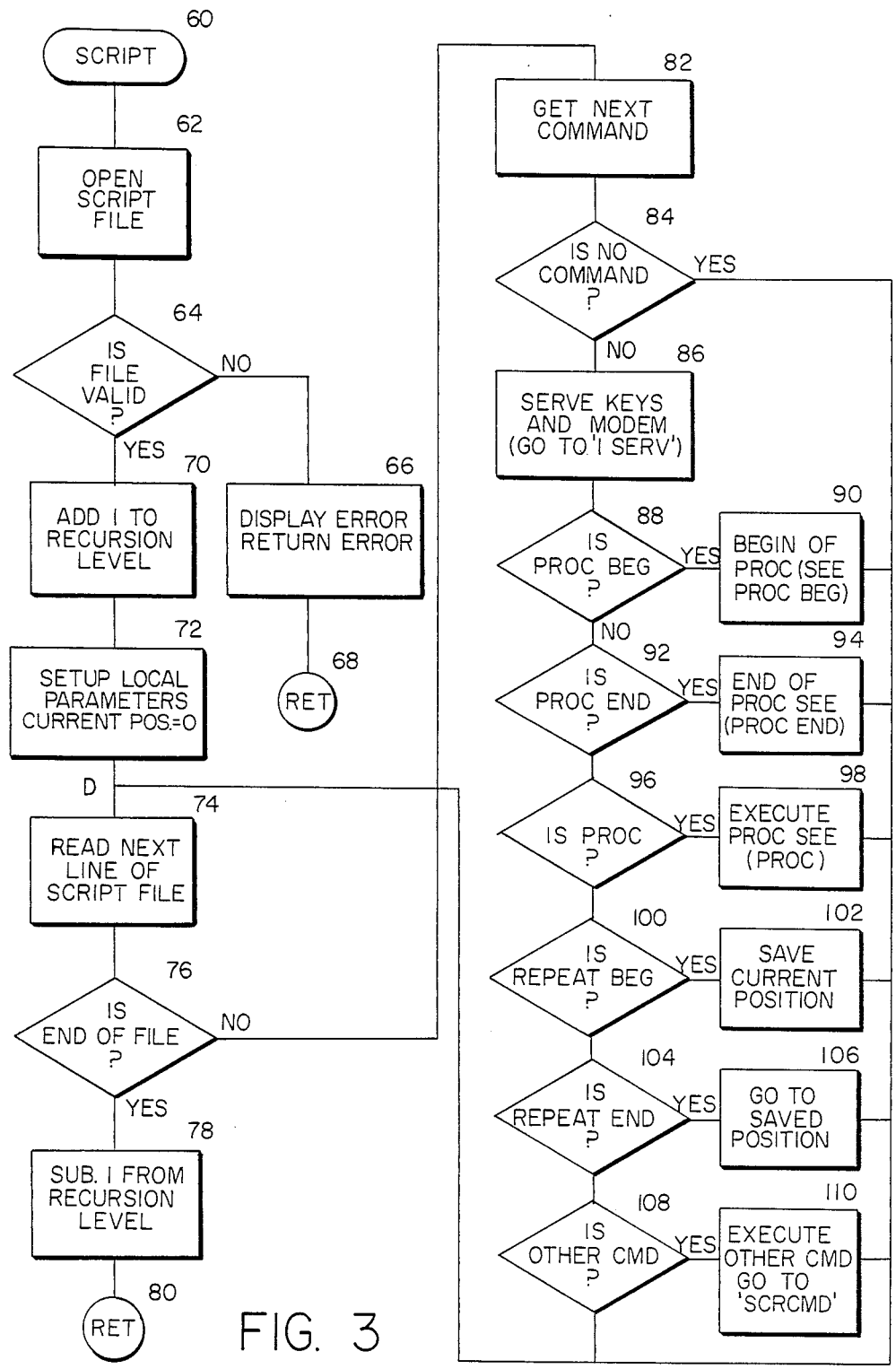
FIG. 3 is a flow chart showing the functional steps of the "Script" subroutine of the present inventive method.

Referring now to FIG. 3, which illustrates the "Script" subroutine 60, when the recursion variables are cleared 30, the script subroutine is called 32. The program first opens the script file 62 and determines whether the file is valid 64. If the script file is not valid, an error is displayed and the "Script" subroutine returns to the calling program 68. If the file is valid, one is added to the recursion level 70 and the local parameters are set up 72. The current position, for example, is set to zero. The program then reads the next line of the script file 74. A determination is next made as to whether it is the end of the file 76. If it is the end of the file, then one is subtracted from the recursion level 78 and the "Script" subroutine returns to the calling program 80. If it is not the end of the file, then the program gets the next command 82. A determination is next made as to whether there is no command 84. If there is no command, the program returns to D and once again reads the next line of the script file 24. If there is a command, then the program checks the input from the subscriber's telephone 86. At this point, the "ISERV" subroutine is called 86.

The program next determines whether it is the beginning of a procedure 88. A procedure is a set of rules or steps to be followed in operating equipment in a computer system. If it is the beginning of a procedure, the program then calls the "Proc Beg" (Procedure Begin) subroutine 90. The program then returns to D and once again reads the next line of the script file 74. If it is not the beginning of a procedure, the program then determines whether it is the end of the procedure 92. If it is the end of the procedure, the program calls the "Proc End" (Procedure End) subroutine 94 and returns to D and reads the next line on the script file 74. If it is not the end of a procedure, the program determines whether there is a procedure 96. If there is a procedure, the program executes the "Proc" (Procedure) subroutine 98 and then returns to D to read the next line of the script file 74.

The program next determines whether it is the beginning of a repeat 100. If it is the beginning of a repeat, the current position is saved 102 and the program returns to D and reads the next line of the script file 74. A repeat is a group of commands that are executed repeatedly. If it is not a repeat beginning, the program determines whether it is the end of a repeat 104. If it is the end of a repeat, the program goes to the saved position 106 and then returns to D to read the next line of the script file 74. If it is not the end of a repeat, the program determines whether it is another command 108. If it is another command, the program calls the "SCRCMD" or script command subroutine and then returns to D and reads the next line of the script file 74. If it is not another command, the program returns to D and reads the next line of the script file 74.

Figure 4:
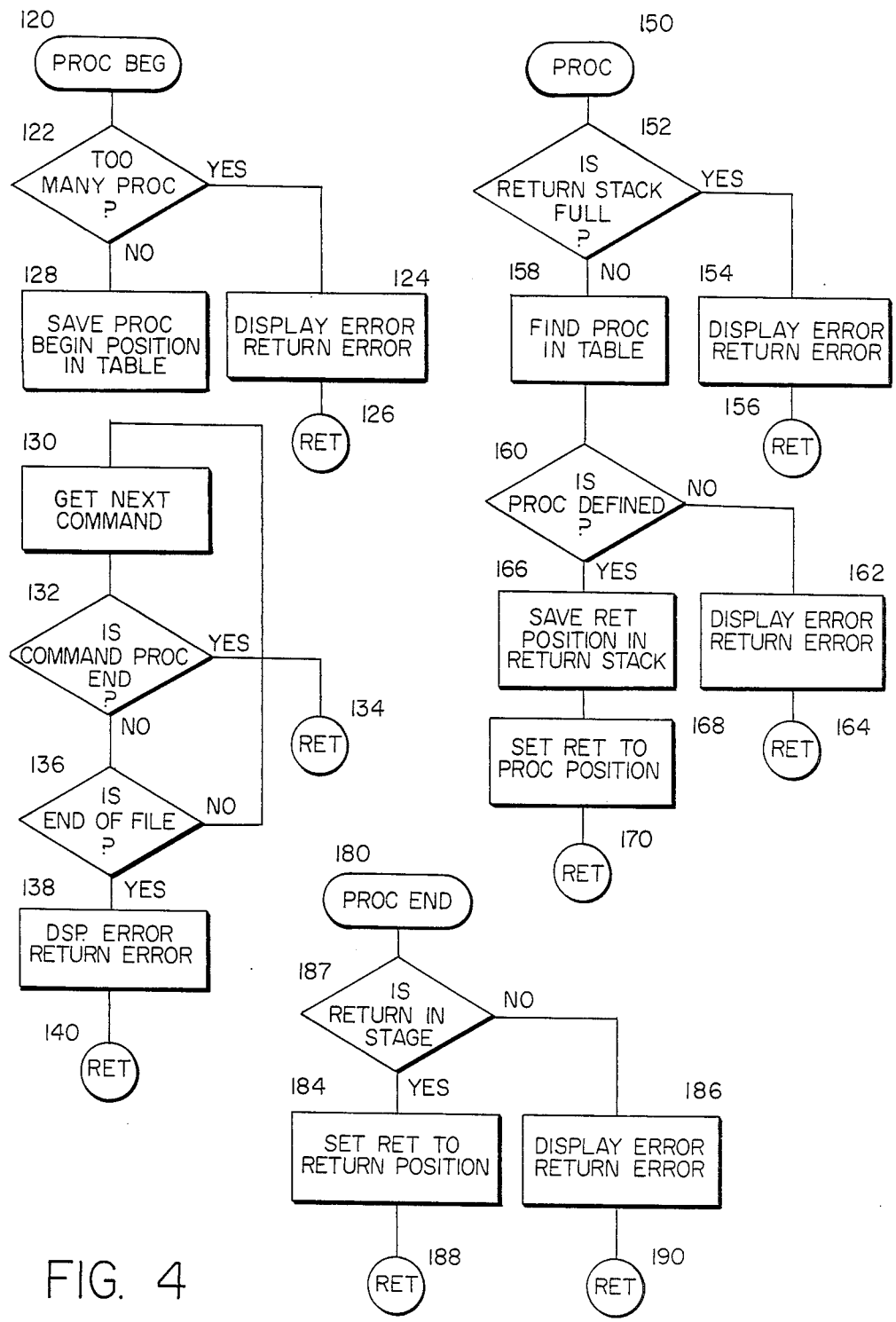
FIG. 4 is a flow chart showing the functional steps of the "Proc Beg", "Proc" and "Proc End" subroutines of the present inventive method.

Reference is now made to FIG. 4, which illustrates the "Proc Beg", "Proc End" and "Proc" subroutines. When it is determined by the script subroutine that it is the beginning of a procedure, the "Proc Beg" subroutine 120 is called 90. The program first determines if there are too many procedures 122. If it is determined that there are too many procedures, an error is displayed and the "Proc Beg" subroutine returns to the "Script" subroutine 126. However, if it is determined that there are not too many procedures, the program saves the procedure begin position in a table 128. The program then gets the next command 130 and determines whether that command is a procedure end command 132. If it is a procedure end command, then the "Proc Beg" subroutine returns to the "Script" subroutine 134.

The "Proc" subroutine 150 is called when it is determined that the line in the script file is a procedure 98. The program first determines whether the return stack is full 152. If the return stack is full, an error is displayed 154 and the program returns to the "Script" subroutine 156. If the return stack is not full, then the program finds the procedure in the table 158. It is then determined whether a procedure is defined 160. If the procedure is not defined, an error is displayed on the CATV control console 162 and the program returns to the "Script" subroutine. If the procedure is defined, the program saves the return position in the return stack 166. The program then sets the return to the procedure position and returns to the "Script" subroutine 168.

The "Proc End" subroutine 180 is called when it is determined by the "Script" subroutine that the line of the script file is the end of a procedure 94. A determination is then made as to whether there is a return in stage 182. If it is determined that there is a return in stage, the return is set to return position 184 and the "Proc End" subroutine returns to the "Script" subroutine 188. If it is determined that the return is not in stage, an error is displayed and the program returns to the "Script" subroutine 190.

Figure 5:
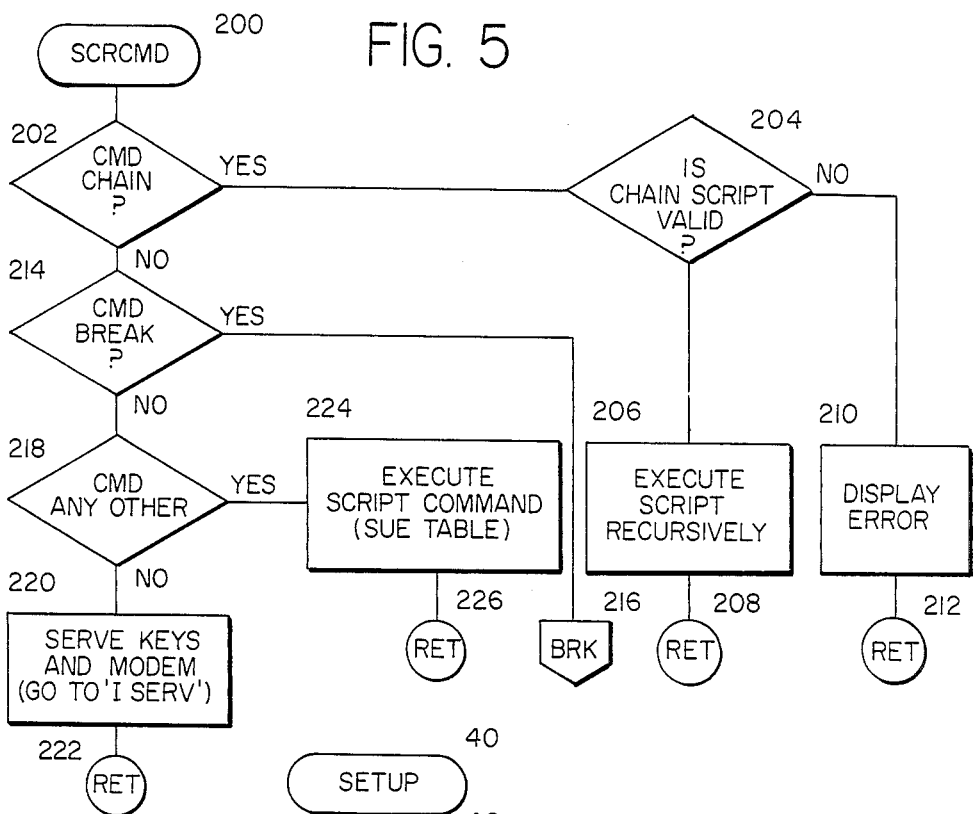
FIG. 5 is a flow chart showing the functional steps of the SCRCMD subroutine of the present inventive method.

Referring now to FIG. 5, which illustrates the "SCRCMD" subroutine, when it is determined that a line in the script file is another command, the "SCRCMD" subroutine 200 is called 110. The program first determines if the command is a chain command 202. A chain command is a group of logically related commands linked together by a pointer. If the command is a chain command, it is determined whether that chain command is valid 204. If that chain command is found to be valid, it is executed recursively 206 and the program then returns to the "Script" subroutine 208. If the chain command is not valid, an error is displayed 210 and the program returns to the "Script" subroutine 212.

If it is determined that the current line of the script file is not a chain command, the program then asks whether it is a "break" command 214. If it is a break command, the program executes the "BRK" subroutine 216. The break command allows the program to periodically check to see whether the default commands should be stopped because a subscriber has called in.

If it is determined that the line in the script file is not a break command, the program then determines if it is some other command 218. If it is not another command, the "ISERV" subroutine is executed 220 and the program returns to the "Script" subroutine 222. If it is determined that the current line in the script file is some other command, the command is executed 224. Table I contains a list of commands that the program may execute at this point. The program then returns to the "Script" subroutine 226. T,0170

Referring now to FIG. 6, which illustrates the "BRK", or break, subroutine 230, when it is determined by the "SCRCMD" subroutine that the current command is a break command, the program executes the "BRK" subroutine 216. The program first determines whether the command is in the default script 232. If it is not, then the program returns to the "SCRCMD" subroutine 234. The program then determines if it has looped n times 236. If the program has looped n times, the program then returns to the "SCRCMD" subroutine. If it is determined that the program has not looped n times, then the script and number is displayed on the television monitor of all subscribers and the file requested by the subscriber is found 240.

A determination is then made as to whether the script file is valid 242. If the script file is valid, the script file is executed 244. The script is then logged in a log file 246 and the display prompts removed from the television monitor and the file removed from queue 250. As will be explained below each selected video information is placed in line or on queue to be broadcast after video information previously selected. The program then returns to E and once again determines if it has looped n times 236. If it is determined that the file is not a valid script file, an error is then displayed on the CATV control console 248, the display prompts cleared and the file removed from queue 250. The program likewise then returns to E and determines whether it has looped n times 236.

Referring now to FIG. 7, which illustrates the "ISERV" subroutine 300, which is called by the control program after the scroll file is setup and read 28. "ISERV" is called by the "Script" subroutine 60 when it is determined that there is a command 86. "ISERV" is also called by the "SCRCMD" subroutine 200. When a determination has been made that the line of the script file read is not any other command 220. The "ISERV" subroutine first determines whether there is a modem present 302. If there is no modem present, the program next executes the "KYSERV" subroutine 306. If there is a modem present, the "TTSERV" subroutine is executed 304 and then the "KYSERV" subroutine 306 is executed. The program then returns to the control program or the subroutine that called it. The "TTSERV" subroutine checks to see whether a subscriber has called to make a selection. This subroutine receives selections, processes the selections and places them on queue. The "KYSERV" subroutine checks to see whether an operator at the cable television station has activated a key on the keyboard. A request for display of video information can be made by an operator of the keyboard. The keyboard also serves as a means of correcting errors and running tests.

Figure 8:
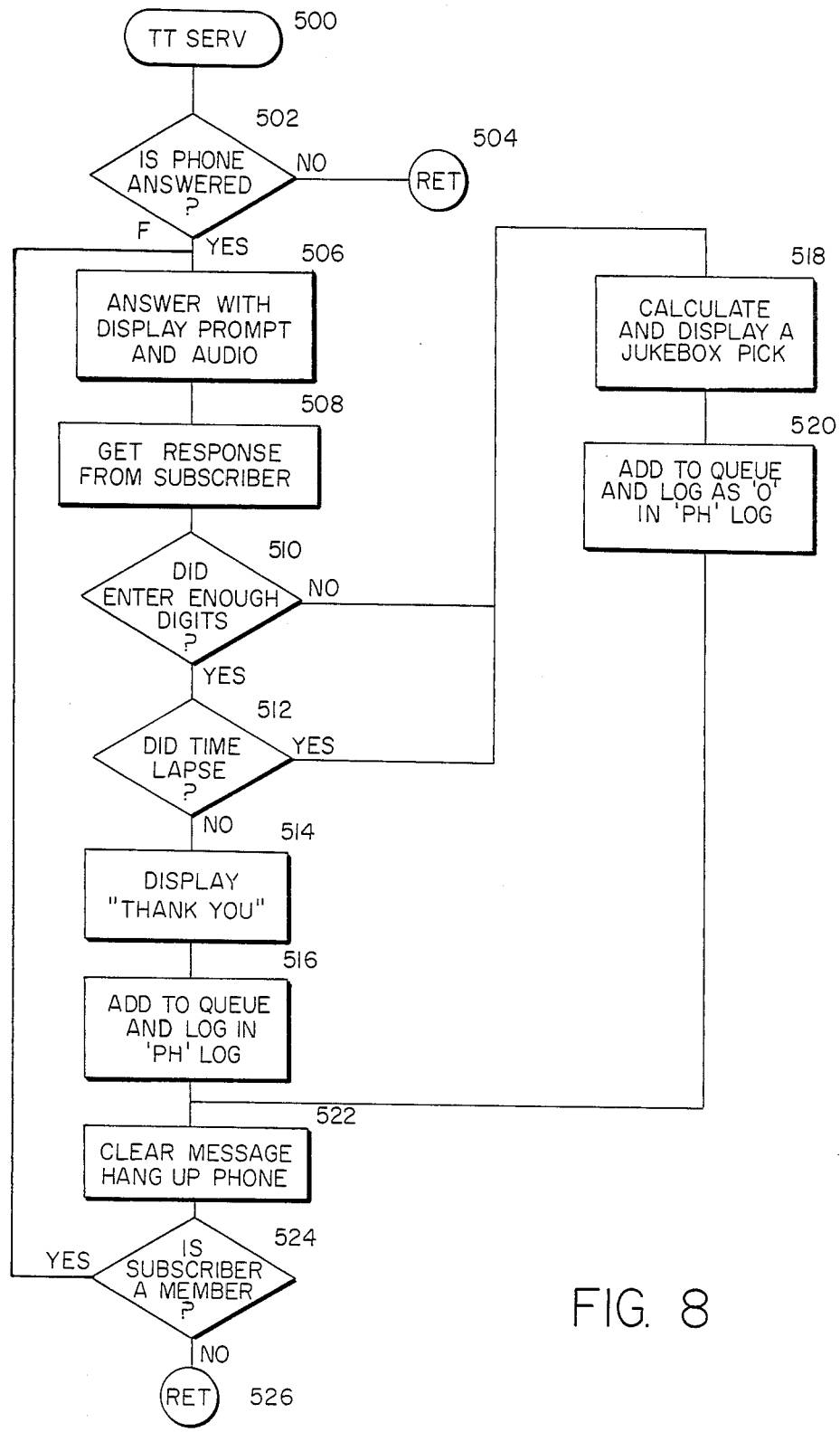
FIG. 8 is a flow chart showing the functional steps of the "TTServ" subroutine of the present inventive method.

Referring now to FIG. 8, which illustrates the "TTSERV" subroutine 500 which is called by the "ISERV" subroutine when it is determined that there is a modem present 304. A determination is first made as to whether the telephone has been answered 502. If the telephone has not been answered, the program returns to the "ISERV" subroutine 504. If the telephone has been answered, a prompt is displayed on all subscriber's television monitors and the audio turned on 506. In this manner the inventive method provides confirmation through the telephone and the television monitor of the subscriber's selection. Other audio information may also be provided such as astrological and sports information. In addition advertising messages may be conveyed. The program then receives the response of the subscriber/caller 508. A determination is made as to whether the subscriber has entered enough digits 510. If it is determined that the subscriber has entered enough digits, a determination is made as to whether the time to enter digits has expired 512. If the time to enter digits has not expired, the words "Thank You" are displayed on the subscriber's television screen 514. The selection of the subscriber is then added to the queue and logged in the "PH" or phone Log 516. The message is cleared and the phone hung up 522. It is then determined whether the subscriber is a club member 524. If the subscriber is a club member the program returns to F and once again answers with a display prompt and audio 506. It is in this way that the program gives a multiple selection for the price of one. If the subscriber is not a club member the program then returns to the "ISERV" subroutine 526. The cable television company may utilize a "900" service of the phone company. With this service the phone company charges the caller a nominal fee for calling. The cable television company then receives a portion of this fee.

If it is determined that the viewer did not enter enough digits 510 or that the time to enter digits has expired 512, then the subroutine calculates and displays a Jukebox Pick 518. A Jukebox Pick is a random selection made by the data processor. The Jukebox Pick is then added to queue and logged as "0" in "PH" Log 520. An important feature of the present inventive method is that a line or queue is made of all the video information selected by the subscribers. Video information is placed on queue with the earlier selected video information preceding the later selected video information. Video information is broadcasted on a first on queue first broadcasted basis. The message is then cleared and the phone hung up 522. The subroutine then returns to the "ISERV" subroutine 524.

Figure 9:
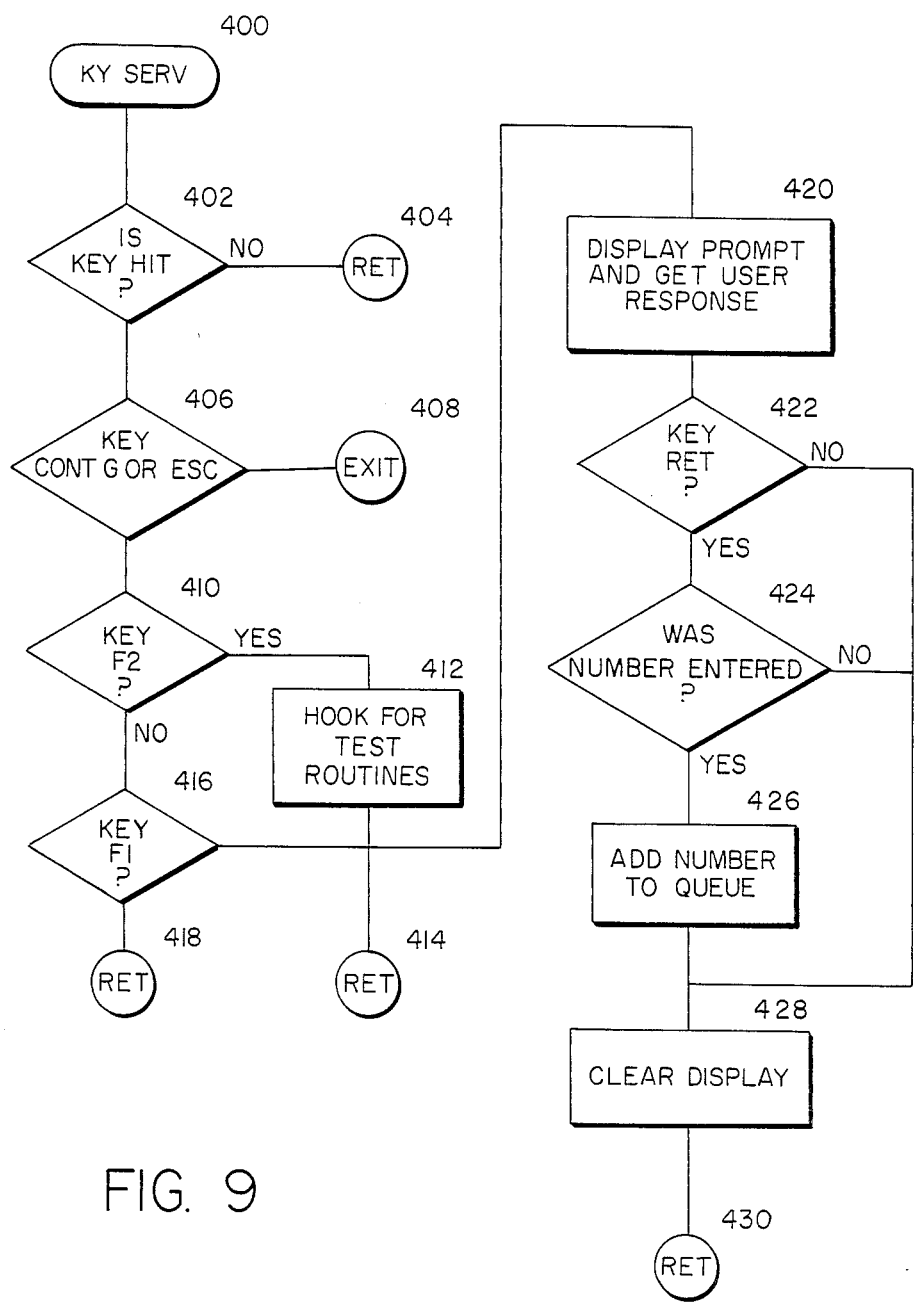
FIG. 9 is a flow chart showing the functional steps of the "KyServ" subroutine of the present inventive method.

Reference is now made to FIG. 9, which is an illustration of the "KYSERV" subroutine 400 that is called by the "ISERV" subroutine after it is determined that there is no modem present or after the modem has been served 306. The subroutine 400 first determines whether keys on the CATV keyboard have been actuated 402. If no key has been actuated, the program returns to the "ISERV" subroutine 404. The subroutine then determines whether an escape key has been actuated. If an escape has been actuated, the program exits or ends 408.

However, if no escape key has been actuated, it is determined whether an F2 key has been actuated 410. If an F2 key has been actuated, test routines are executed 412 and the program returns to the "ISERV" subroutine 414.

If it is determined that the F2 key has not been actuated, it is then determined whether the F1 key has been actuated 416. If it is determined that the F1 key has not been actuated, the program returns to the "ISERV" subroutine.

If it is determined that the F1 key has been actuated, a prompt is displayed and the user's response obtained 420. The program then determines whether the key actuated was the return key 422. If the return key was actuated, the program determines whether a number was entered 424. If it is determined that a number was entered, the number is added to the queue 426. The display is then cleared 428 and the program returns to the "ISERV" subroutine 430.

If it is determined that no return key has been actuated the subscriber's display is cleared and the program returns to the "ISERV" subroutine 430.

Figure 10:
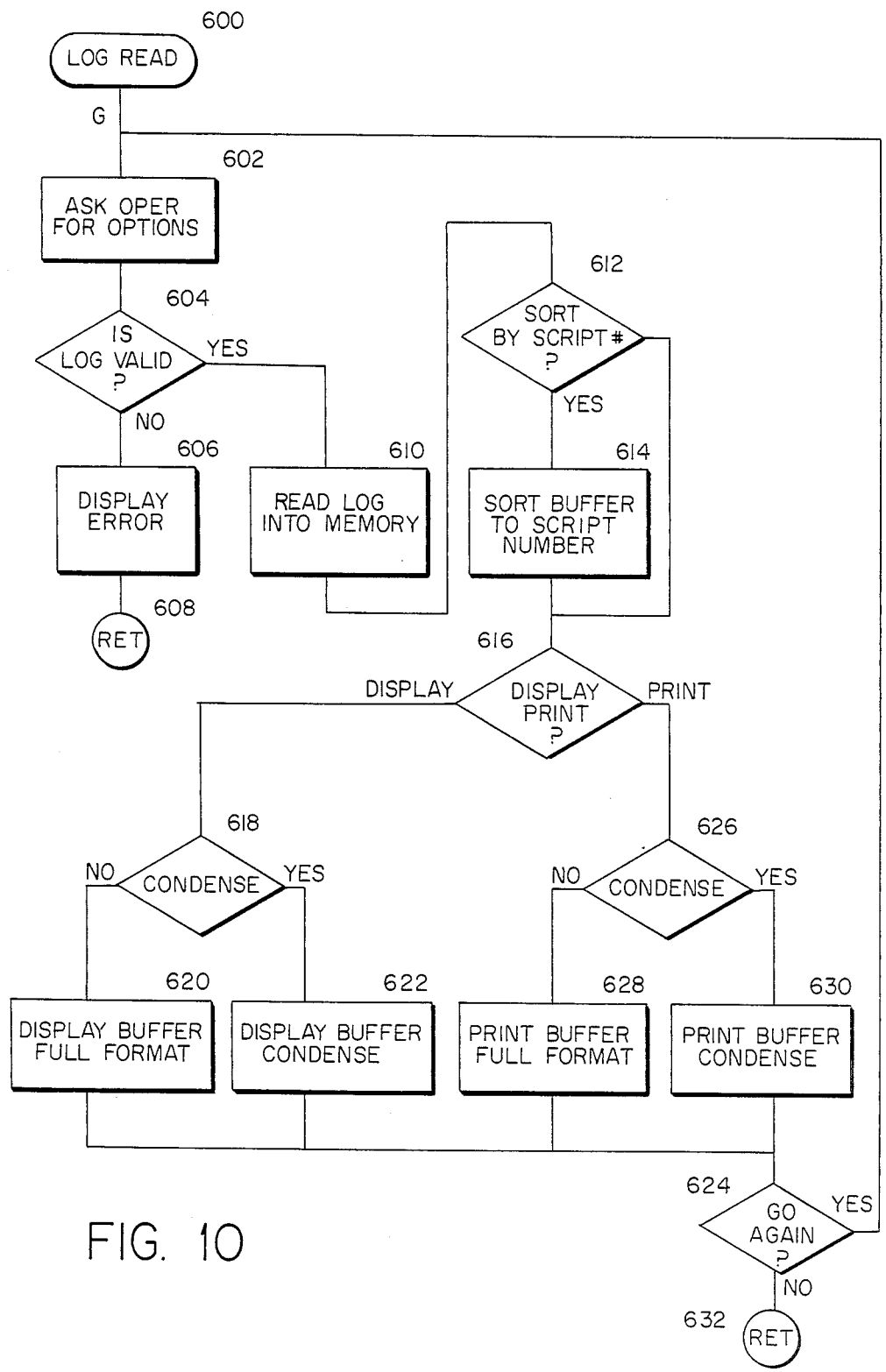
FIG. 10 is a flow chart showing the functional steps of the "Log Read" companion program to the present inventive method and FIG. 11 is a schematic functional block diagram of the hardware system for use with applicant's invention.

Reference is now made to FIG. 10, which illustrates a companion program useful for displaying or printing the contents of log files generated by the inventive method. These log files contain data including what video information has been broadcast and what commercials have been broadcast and other useful information. Log files are used primarily by the cable television system but may be available to the subscriber under certain circumstances. The log file is first read into the data processor 600. The operator is then asked for options 602. A determination is then made as to whether the log file is valid 604. If the log file is not valid, an error is displayed and the program returns to G and once again asks for options 602. If it is determined that the log file is valid, then the log file is read into a buffer memory 610. A determination is next made as to whether the log file is sorted by script number 612. If the log file is not sorted by script number, then the buffer contents are sorted by script number 614. After the log file is sorted by script number or if the log file is already sorted by script number, a determination is then made as to whether to print or display the log file 616.

If it is determined that the log file is to be displayed, a decision is then made whether to condense the log file 618. If it is determined to condense the log file, the buffer contents are then displayed in condensed format 622. If it is determined not to condense the log file, then the buffer contents are then displayed in full format 620. After the buffer contents are displayed in either condensed or full format, a decision is made whether to repeat the whole process 624. If it is determined that the whole process is not to be repeated, then the program returns to the calling program 632. If it is determined to repeat the whole process, the program then returns to F and once again asks the operator for options 602. If a determination is made to print the log file, a decision is then made whether to condense the log file 626. If it is determined to condense the log file, the buffer is printed in condensed format 630. If it is determined not to condense the log file, the buffer is printed in full format 628. After the buffer is printed in either format, a decision is made to determine whether the whole operation should be repeated 624. If the whole operation is not to be repeated, then the program returns to the calling program 632. If it is determined to repeat the whole operation, the program then returns to F and once again asks the operator for options 602.

Figure 11:
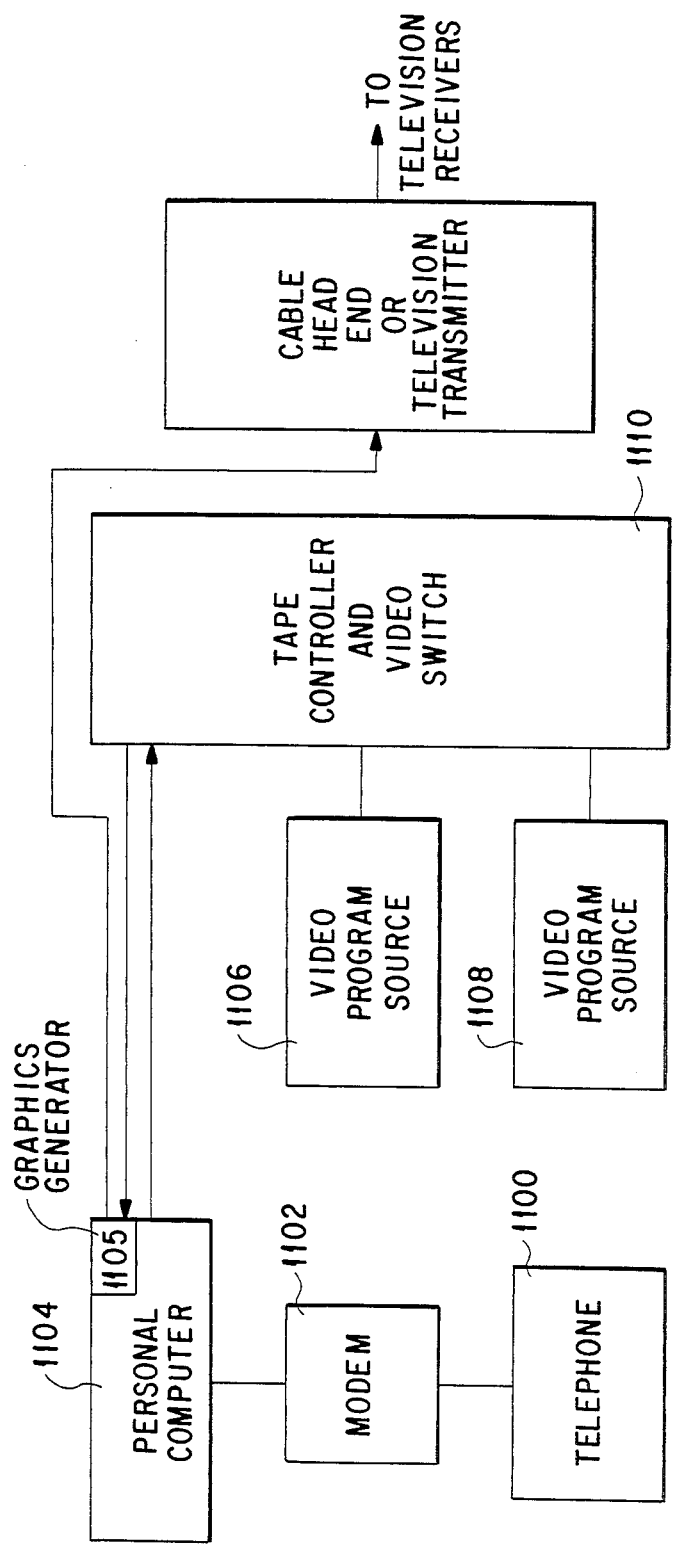

FIG. 11 is a functional schematic block diagram of apparatus which may be used with the present invention. The hardware system shown in FIG. 11, using the method disclosed hereinbefore, may be used to answer a telephone call from telephone 1100 using the modem 1102 and personal computer 1104, as previously described. The caller from the telephone 1100 would then enter a digital code corresponding to the desired selection, as has also been previously described. The programmed personal computer 1104 then directs the tape controller and video switch 1110 to locate the appropriate video program device 1106 or 1108 and the location on that video program device of the selection desired by the caller, as previously described herein. The tape controller portion of the tape controller and video switch 1110 functions to control video tape machines which were commercially available at the time of filing the application.

In addition, if a laser video disk player (not shown) contained the desired selection, then the personal computer 1104 would directly actuate that device and cause the output from the laser video disk player to be fed to the video switch portion of the tape controller and video switch 1110. The LVJB and LWVB commands referred to previously would be used to control such a laser video disk player.

Once the appropriate video program source has been located and instructed to output the selected video program material, the video switch portion of the tape controller and video switch 1110 operates to transmit the selected video material to the graphics generator 1105. It is then transmitted to the cable television system head end or to a television transmitter 1112 for broadcast over one of the channels of the cable television system or through the atmosphere, respectively, to television receivers.

The menus generated by the computer 1104 would be converted to video graphics by the graphics generator 1105 and superimposed on the video signal output from the video controller and video switch 1110. The menus are generated in accordance with the flow charts set forth in FIGS. 3-5.

What is claimed is:

1. Apparatus for the remote viewing of selected video program material at subscriber remote receiving locations, comprising:
 (a) television broadcasting means at a central location for providing a television signal for transmission to said remote locations over a single common channel;
 (b) means at said central location for providing video program signals to said television broadcasting means;
 (c) at least one selectable source of video program materials;
 (d) selection means for generating a selection signal for enabling each subscriber remote receiving location to select video program material to be broadcast over the single common channel with such selection being made through a telephone system keypad; and
 (e) programmed data processor means coupled to said at least one selectable source of video program materials and said means for providing video program signals to said television broadcasting means, said programmed data processor being responsive to the telephonically transmitted selection signal from a remote location selecting desired video program material for transmission by said televison broadcasting means over the single common channel for viewing by all of said subscriber remote receiving locations on the single common channel, said programmed data processor providing control signals to said at least one selectable source of video program materials in accordance with the desired video program material selected by a subscriber remote receiving location such that selected video program material is coupled by said means for providing video program signals to said television broadcasting means for transmission over the single common channel to all of the said subscriber remote receiving locations viewing the single common channel irrespective of whether the subscribers at such locations have selected any video program material so that a viewer at a remote receiving location may tune a television receiver at that location to the single common channel in order to sequentially view all of the selected video program materials transmitted by said television broadcasting means over the single common channel, said programmed digital processor means further providing information identifying said video program materials on said single common channel in addition to said video program material.

2. A method for the remote viewing of selected video program material at subscriber remote receiving locations, comprising the steps of:
 (a) providing television broadcasting means at a central location for providing a television signal for transmission to said remote locations over a single common channel;

(b) providing video program signals to said television broadcasting means;

(c) providing at least one selectable source of video program materials;

(d) generating a selection signal for enabling each subscriber remote receiving location to select video program material to be broadcast over the single common channel with such selection being made through a telephone system keypad;

(e) providing programmed data processor means coupled to said at least one selectable source of video program materials and for providing video program signals to said television broadcasting means, said programmed data processor being responsive to the telephonically transmitted selection signal from a remote location selecting desired video program material for transmission by said television broadcasting means over the single common channel for viewing by all of said subscriber remote receiving locations on the single common channel, said programmed data processor providing control signals to said at least one selectable source of video program materials in accordance with the desired video program material selected by a subscriber remote receiving location such that selected video program material is coupled to said television broadcasting means for transmission over the single common channel to all of the said subscriber remote receiving locations viewing the single common channel irrespective of whether the subscribers at such locations have selected any video program material so that a viewer at a remote receiving location may tune a television receiver at that location to the single common channel in order to sequentially view all of the selected video program materials transmitted by said television broadcasting means over the single comon channel; and (f) providing information identifying said video program materials on said single common channel in addition to said video program material.

3. A method for the remote viewing of selected video program material at remote receiving locations, comprising the steps of:

(a) providing television broadasting means at a central location for providing a television signal for transmission to said remote receiving locations over a single common channel;

(b) providing video program signals to said television broadcasting means;

(c) providing at least one selectable source of video program materials;

(d) generating a selection signal for enabling the remote selection of video program material to be broadcast over the single common channel with such selection being made through a telephone system keypad;

(e) providing programmed data processor means coupled to said at least one selectable source of video program materials and for providing video program signals to said television broadcasting means, said programmed data processor being responsive to the telephonically transmitted selection signal from a remote location selecting desired video program material for transmission by said television broadcasting means over the single common channel for viewing by all of said remote receiving locations on the single common channel, said programmed data processor providing control signals to said at least one selectable source of video program materials in accordance with the desired video program material selected such that selected video program material is coupled to said television broadcasting means for transmission over the single common channel to all of the said remote receiving locations viewing the single common channel irrespective of whether the viewers at such locations have selected any video program material so that a viewer at a remote receiving location may tune a television receiver at that location to the single common channel in order to sequentially view all of the selected video program materials transmitted by said television broadcasting means over the single common channel; and (f) providing information identifying said video program materials on said single common channel in addition to said video program material.

4. The method of claim 2, further including the step of entering a digital code by means of said telephone system keypad.

5. The method of claim 2, further including the step of placing on queue said selected desired video program material.

6. The apparatus of claim 1, wherein said televison broadcasting means comprises a television transmitter.

7. The apparatus of claim 1, wherein said televison broadcasting means comprises a cable head end.

8. The method of claim 2, further including the step of broadcasting predetermined programmed data processor selected video program material for remote viewing at subscriber remote receiving locations.

9. The method of claim 2, further including the step of billing each subscriber who selects video program material for broadcast by said television broadcasting means.

10. The method of claim 9, wherein said step of billing comprises the use of a third-party 976-Dial It System for billing each said subscriber.

11. The method of claim 8, wherein said predetermined programmed data processor selected video program material is selected by an operator of said programmed data processor.

12. The apparatus of claim 1, wherein said information identifying the video program materials is comprised of at least one of the title and performer of each of said video program materials.

13. The method of claim 2, wherein said information identifying the video program materials is comprised of at least one of the title and performer of each of said video program materials.

14. The method of claim 3, wherein said information identifying the video program materials is comprised of at least one of the title and performer of each of said video program materials.

15. The method of claim 3, further including the step of entering a digital code by means of said telephone system keypad.

16. The method of claim 3, further including the step of placing on queue said selected desired video program material.

17. The method of claim 3, further including the step of broadcasting predetermined programmed data processor selected video program material for remote viewing at remote receiving locations.

18. The method of claim 3, further including the step of billing for each selection of video program material for broadcast by said television broadcasting means.

19. The method of claim 3, wherein said step of billing comprises the use of a third-party 976-Dial It System for billing for each said selection.

20. The method of claim 17, wherein said predetermined programmed data processor selected video program material is selected by an operator of said programmed data processor.

* * * * *

UNITED STATES PATENT AND TRADEMARK OFFICE
CERTIFICATE OF CORRECTION

PATENT NO. : 4,761,684

DATED : August 2, 1988

INVENTOR(S) : Morris Clark, Kenneth Lawson and James Izatt

It is certified that error appears in the above-identified patent and that said Letters Patent is hereby corrected as shown below:

In DETAILED DESCRIPTION OF THE PREFERRED EMBODIMENT

In Column 6, line 57, please delete "T,1070" and replace with --Table I

| | |
|---|---|
| Textcolor | Sets the color of the text to be displayed in the scroll and in the current script number displayed. |
| Backcolor | Sets the color of the text background if any is used. |
| Border | Sets the color of the solid border. |
| Row | Sets up the current row cursor position. To be used with printtext. |
| Column | Sets up the current column cursor position. To be used with printtext. |
| Printtext | Prints string of text at current cursor position. |
| Erasetext | Erase Text printed on certain row. |
| Graphback | Changes graphics background to certain color. |
| Dispic | Retrieves file a picture and displays it. |
| LVJB | Selects section of laser disk to be played. |
| Delay | Causes a delay for N amount of seconds. |

UNITED STATES PATENT AND TRADEMARK OFFICE
CERTIFICATE OF CORRECTION

PATENT NO. : 4,761,684
DATED : August 2, 1988
INVENTOR(S) : Morris Clark, Kenneth Lawson and James Izatt It is certified that error appears in the above-identified patent and that said Letters Patent is hereby corrected as shown below:

| | |
|---|---|
| Graphonly | Displays graph only with no video showing. |
| Superimp | Superimposes graphics over video. |
| Videoonly | Displays video only with no graphics shown. |
| Audiocart | Triggers audio cart switch. |
| Videotape | Send address and begins playing of certain spots on tape machine. |
| Wvideotape | Waits for video tape to complete spot. |
| Audio1 | Activates audio channel one. |
| Audio2 | Activates audio channel two. |
| Switchon | Turns external switch on. |
| Switchoff | Turns external switch off. |
| Modemon | Allows modem to answer. |
| Addlog | Adds a number to LG log. |
| Sound | Activates a tone at console.-- |

UNITED STATES PATENT AND TRADEMARK OFFICE
CERTIFICATE OF CORRECTION

PATENT NO. : 4,761,684

DATED : August 2, 1988

INVENTOR(S) : Morris Clark, et al

It is certified that error appears in the above-identified patent and that said Letters Patent is hereby corrected as shown below:

In WHAT IS CLAIMED IS:

In Column 11, line 39, please replace "comon" with --common--.

Signed and Sealed this

Twenty-sixth Day of February, 1991

Attest:

HARRY F. MANBECK, JR.

*Attesting Officer*     *Commissioner of Patents and Trademarks*